(12) United States Patent
Goodwin, III

(10) Patent No.: US 6,774,765 B1
(45) Date of Patent: Aug. 10, 2004

(54) SYSTEM AND METHOD OF DISPATCHING AN INDIVIDUAL IN A TRANSACTION ESTABLISHMENT

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 947 days.

(21) Appl. No.: 09/099,546

(22) Filed: Jun. 18, 1998

(51) Int. Cl.[7] .................................................. H04Q 1/00
(52) U.S. Cl. ................................. 340/7.28; 340/539.18
(58) Field of Search ...................... 340/825.44, 825.49, 340/571, 572, 539, 573.1, 825.08, 825.21, 825.47, 825.45, 10.1, 989, 10.32, 577, 10.4; 342/51, 457; 455/38.1, 38.2

(56) References Cited

U.S. PATENT DOCUMENTS

| | | | |
|---|---|---|---|
| 4,002,886 A | | 1/1977 | Sundelin ................. 235/61.7 R |
| 4,500,880 A | | 2/1985 | Gomersall et al. ...... 340/825.35 |
| 4,891,650 A | | 1/1990 | Sheffer ........................ 342/457 |
| 4,924,363 A | | 5/1990 | Kornelson ................... 362/125 |
| 5,172,314 A | | 12/1992 | Poland et al. ................ 364/401 |
| 5,189,395 A | * | 2/1993 | Mitchell ...................... 340/539 |
| 5,389,935 A | * | 2/1995 | Drouault ...................... 342/457 |
| 5,448,226 A | | 9/1995 | Failing, Jr. et al. ...... 340/825.35 |
| 5,465,082 A | | 11/1995 | Chaco |
| 5,485,163 A | | 1/1996 | Singer et al. ................ 342/457 |
| 5,534,851 A | | 7/1996 | Russek |
| 5,552,772 A | * | 9/1996 | Janky et al. ................. 340/573 |
| 5,602,739 A | * | 2/1997 | Haagenstad ................. 340/989 |
| 5,742,233 A | * | 4/1998 | Hoffman ................... 340/573.1 |
| 5,757,281 A | * | 5/1998 | Schwendeman et al. ...................... 340/825.55 |
| 5,767,788 A | * | 6/1998 | Ness ....................... 340/825.49 |
| 5,818,346 A | * | 10/1998 | Goodwin ................ 340/825.49 |
| 5,832,187 A | * | 11/1998 | Pedersen ...................... 340/577 |
| 5,945,919 A | * | 8/1999 | Trask ..................... 340/825.49 |
| 6,011,487 A | * | 1/2000 | Plocher .................. 340/825.49 |

FOREIGN PATENT DOCUMENTS

| | | |
|---|---|---|
| CA | 2137002 | 5/1993 |
| CA | 2203302 | 10/1997 |
| EP | 0 787 999 A2 | 1/1997 |
| WO | 98/08203 | 2/1998 |

* cited by examiner

Primary Examiner—Brian Zimmerman
(74) Attorney, Agent, or Firm—Paul W. Martin

(57) ABSTRACT

A system and method of dispatching an individual in a transaction establishment which employs a communication system and pagers. In a preferred embodiment, the system includes a telephone or other alert device for receiving a first message indicative of a problem, a recording device for recording a location of the problem from the first message, an electronic price label system including a number of transmitters in the transaction establishment for transmitting a second message addressed to a pager carried by the individual and a number of receivers in the transaction establishment for receiving a third message from the pager and a computer which determines a location of the pager from signal strength information from the third message and which sends a fourth message containing the location of the problem to the pager carried by the individual to alert the individual to respond to the problem. The first message may be from a customer in the transaction establishment, an employee of the transaction establishment, or a system in the transaction establishment. The choice of a responding individual may be based upon the person's skill or proximity to the problem.

15 Claims, 2 Drawing Sheets

SYSTEM AND METHOD OF DISPATCHING AN INDIVIDUAL IN A TRANSACTION ESTABLISHMENT

BACKGROUND OF THE INVENTION

The present invention relates to paging systems, and more specifically to a system and method of dispatching an individual in a transaction establishment.

In many environments today, there is a growing need to quickly notify and direct key individuals. For example, in retail establishments, employees must be notified and directed to provide services such as customer assistance, employee assistance, and system failure recovery services. Even through multiple employees may be in the establishment at any given time, it would be advantageous to notify and direct a particular individual, based upon that individual's location or expertise.

Some transaction establishments include electronic price label (EPL) systems. EPL systems typically include a plurality of EPLs for merchandise items in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency transmitters to transmit acknowledgment signals acknowledging receipt of messages and to relay acknowledgment signals from other EPLs to receiving devices coupled to a main EPL computer.

It would be desirable to providing a system within a transaction establishment which could notify an individual to provide services within the store. It would also be desirable to provide a system which could determine the location of employees by locating their pagers. Finally, it would further be desirable to use an existing EPL system to locate and direct an employee.

SUMMARY OF THE INVENTION

In accordance with the teachings of the present invention, a system and method of dispatching an individual in a transaction establishment is provided.

The system includes telephone or other alert device for receiving a first message indicative of a problem, a recording device for recording a location of the problem from the first message, an electronic price label system including a number of transmitters in the transaction establishment for transmitting a second message addressed to a pager carried by the individual and a number of receivers in the transaction establishment for receiving a third message from the pager and a computer which determines a location of the pager from signal strength information from the third message and which sends a fourth message containing the location of the problem to the pager carried by the individual to alert the individual to respond to the problem.

The first message may be from a customer in the transaction establishment, an employee of the transaction establishment, or a system in the transaction establishment.

The dispatching method includes the steps of receiving a message indicative of a problem, recording a location of the problem from the message, locating pagers carried by the individual and other individuals in the transaction establishment including the substeps of transmitting a query message addressed to the pagers and sending responses to the query message by the pagers and receiving the responses by a plurality of receivers and determining locations of the pagers using signal strength information determined from the responses, choosing the individual to respond to the message, and sending a message containing the location of the problem to the pager carried by the individual to alert the individual to respond to the problem.

The choice of responding individual may be based upon the person's skill or proximity to the problem.

It is accordingly an object of the present invention to provide a system and method of dispatching an individual in a transaction establishment.

It is another object of the present invention to provide a system and method of dispatching an individual in a transaction establishment which can locate the individual by locating a pager carried by the individual.

It is another object of the present invention to provide a system and method of dispatching an individual in a transaction establishment which can locate individuals carrying pagers and dispatch the closest individual.

It is another object of the present invention to provide a system and method of dispatching an individual in a transaction establishment which can determine the most skilled individual carrying a pager and dispatch the most skilled individual.

It is another object of the present invention to provide a system and method of dispatching an individual in a transaction establishment which makes use of an electronic price label system.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
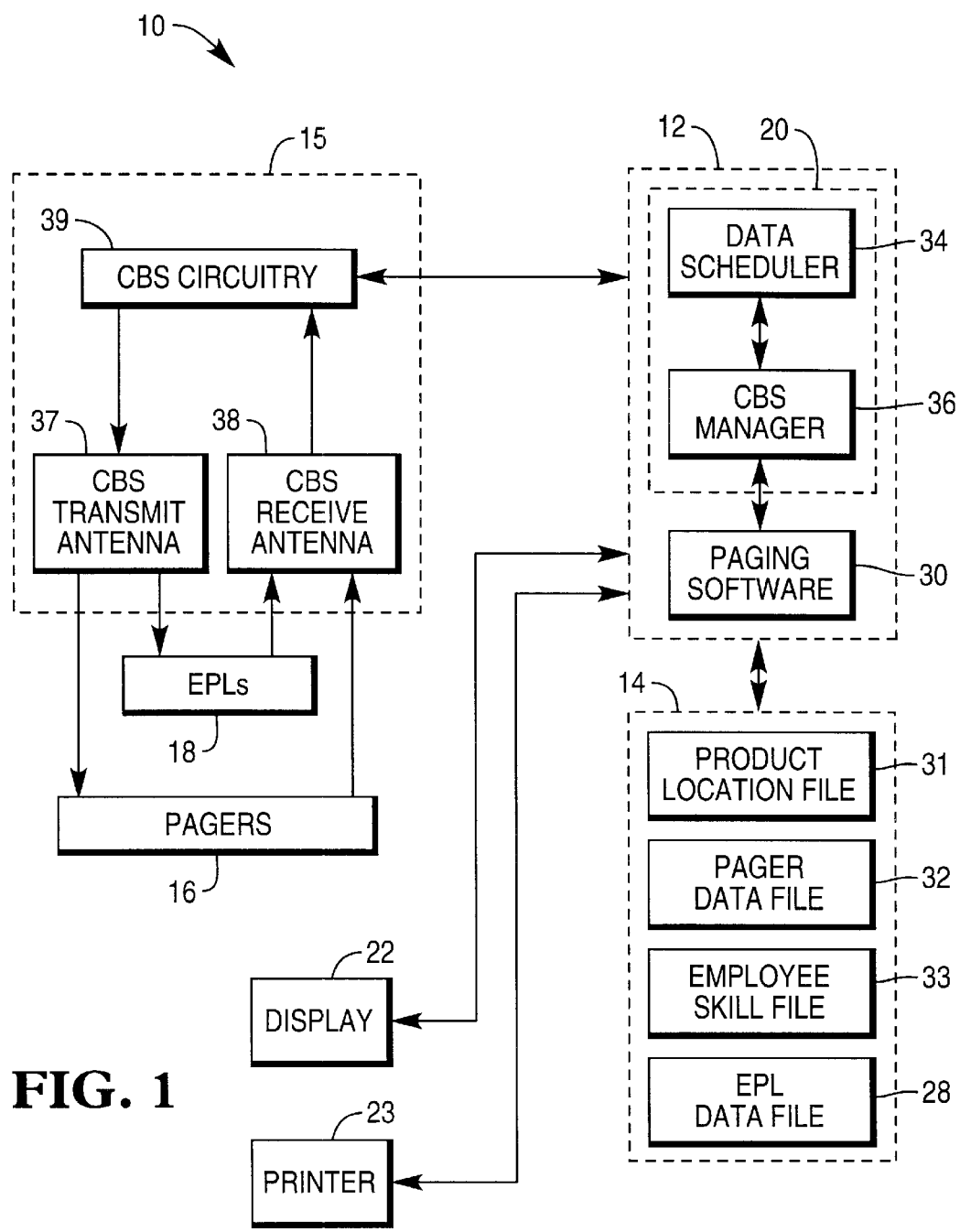
FIG. 1 is a block diagram of a paging system.

Referring now to FIG. 1, system 10 includes computer 12, storage medium 14, communication base stations (CBSs) 15, pagers 16, display 22, and printer 23. System 10 also forms the basis for an electronic price labels (EPL) system including EPLs 18. However, the present invention envisions that other suitable known communication equipment may be employed in store environments that do not already have EPL systems.

Computer 12 executes control software 20 and paging software 30. Control software 20 records, schedules, and transmits all messages to pagers 16 and EPLs 18 through CBSs 15, and receives and analyzes status messages from pagers 16 and EPLs 18 through CBSs 15. Such messages include queries to individual pagers 16 requesting an acknowledgment signal from the individual pagers 16 so that paging software 30 can determine where the individual pagers 16 are located.

Control software 20 primarily includes data scheduler 34 and CBS manager 36. Data scheduler 34 schedules paging messages to be sent to pagers 16 through CBSs 15. If system 10 also functions as a price display system, data scheduler 34 also schedules EPL price change messages to be sent to EPLs 18.

CBS manager 36 schedules the actual transmission of messages to pagers 16 and EPLs 18 and the reception of messages from pagers 16 and EPLs 18.

Pagers 16 contain uniquely addressable transceiver circuitry. The transceiver circuitry can be queried by computer 12 and can transmit responses to query messages.

After a request for customer assistance is received by store personnel, paging software 30 records the customer's location, automatically monitors system 10 for received signal strength, determines the locations of pagers 16, and identifies an employee carrying one of pagers 16 to assist the customer at the customer's location. Paging software 30 may dispatch a nearest employee to the customer or dispatch a nearest employee trained in products the customer wishes help. For the latter operation, paging software 30 uses product location file 31, which contains product location information, and employee skill file 33, which contains employee information and employee skill information in terms of product classes.

Paging software 30 also receives other requests besides customer assistance requests, including employee assistance requests and system failure recovery services request. Paging software 30 and handles them in a similar fashion. Employee assistance requests may include check authorization requests and product pickup assistance requests. System failure recovery services requests may be generated verbally or by automatic monitoring software. They may be processed by a central employee or processed automatically by paging software 30.

Paging software 30 optionally stores the locations of pagers 16 in pager data file 32 and displays or prints location results on display 22 and printer 23 for operator review and manual deployment of employees. Pager data file 32 contains identification numbers and names of employees assigned to the pagers. Pager data file 32 may additionally contain pager status information to assist store personnel in troubleshooting pager failures.

If system 10 also functions as a price display system, control software 20 maintains EPL data file 28, which contains item information, identification information, item price verifier information, and status information for each of EPLs 18.

Storage medium 14 is preferably a fixed disk drive. Storage medium 14 stores EPL data file 28, product location file 31, pager data file 32, and employee skill file 33.

CBSs 15 each include one transmit antenna 37 and up to four receive antennas 38 for transmitting and receiving messages between CBSs 15 and pagers 16 and EPLs 18. CBSs 15 each include CBS circuitry 39 which controls operation of each CBS.

Figure 2:
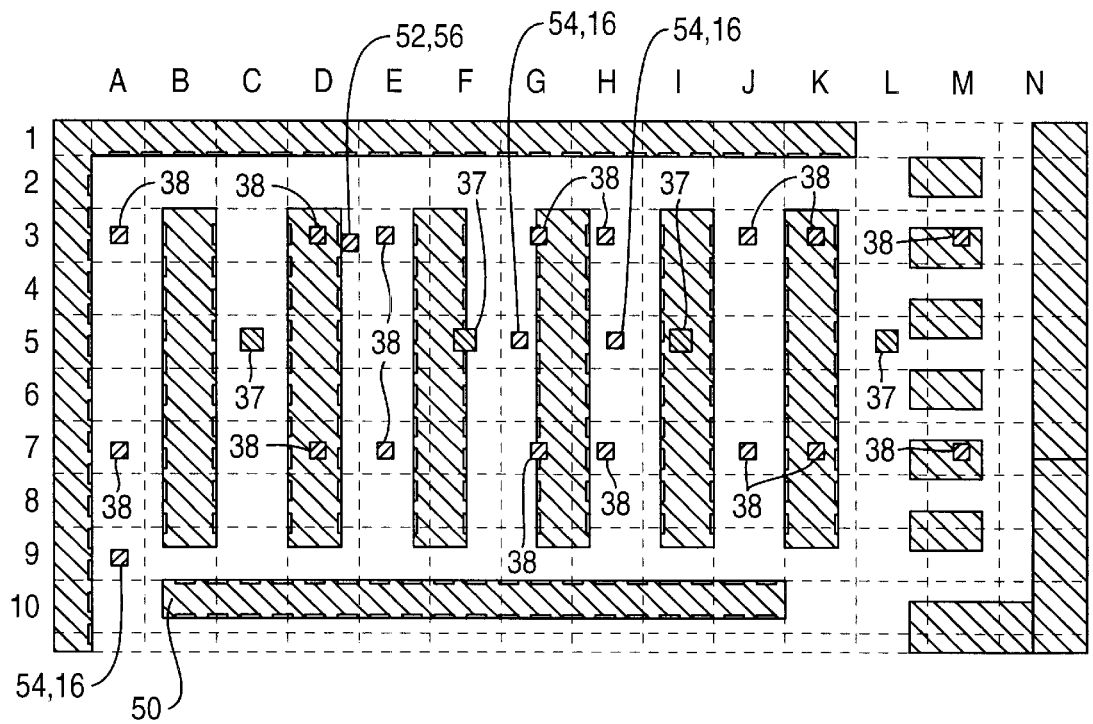
FIG. 2 is an example of a map of a transaction establishment.

Turning now to FIG. 2, a map of a transaction establishment illustrates the location of shelves 50, a customer 52 in need of help, and employees 54 carrying pagers 16.

The locations of pagers 16 are referenced to a two-dimensional coordinate system in which rows are identified by numerals and columns are identified by letters.

In this example, customer 52 is located at position 3D. Customer 52 alerts store personnel using a courtesy phone, button, or other known alerting device 56 for such purpose.

The alerting device may send a signal to computer 12 automatically identifying it's location and product class information to paging software 30. Alternatively, an operator may enter the location of customer 52, manually determine product class information from printed or stored data, and enter the product class information into computer 12 so that paging software can choose the most skilled employee nearest to customer 52. As another alternative, product class information may be stored and retrieved by paging software 30 from product location file 31.

Receive antennas 38 are located at 3A, 7A, 3D, 7D, 3E, 7E, 3G, 7G, 3H, 7H, 3J, 7J, 3K, 7K, 3M, and 7M. Transmit antennas 37 are located at 5C, 5F, 5I, and 5L.

In this example, receive antennas 38 receive acknowledgment signals from pagers 16. Signal strength measurements are recorded for each pager 16 from each receive antenna 38. Paging software 30 determines fix information for each of pagers 16 using known triangulation techniques and records the fix information in pager data file 32.

For example, suppose that three receive antennae 38 at positions 7E, 7G, and 3G receive an acknowledgment signal from pager 16 at location 5G. Antenna 7E reports a relative signal strength of "30", and antennae 3G and 7G report relative signal strengths of "60". Paging software 30 triangulates this relative strength information to locate pager 16 at or in close proximity to location 5G.

Figure 3:
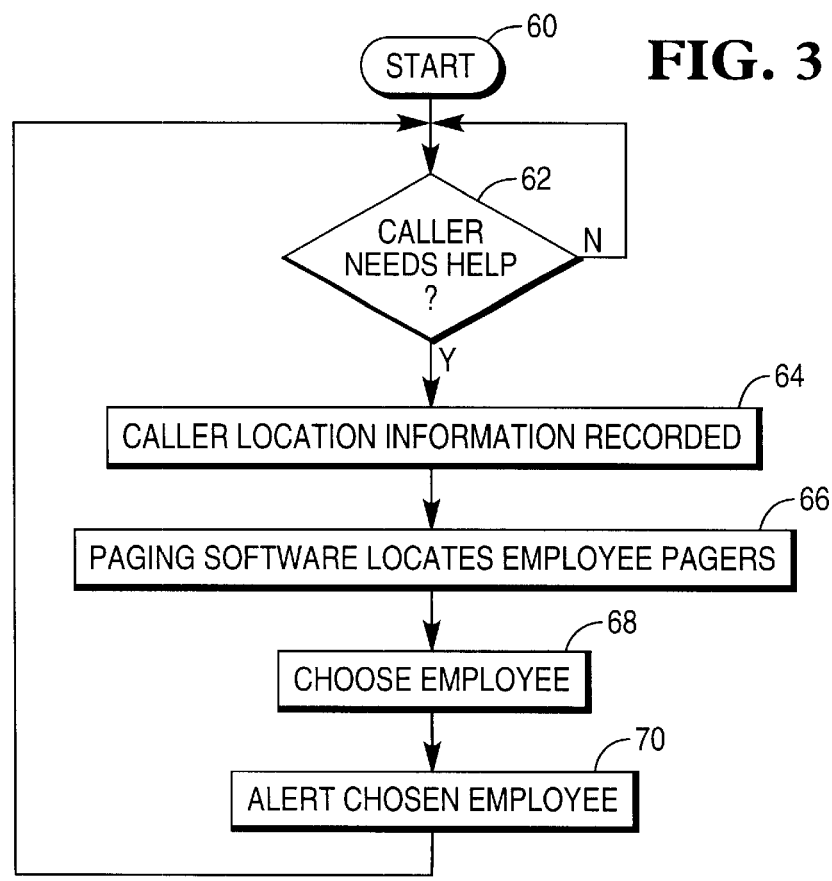
FIG. 3 is a flow diagram illustrating the dispatching method.

Turning now to FIG. 3, the operation of paging software 30 is explained in more detail, beginning with START 60.

In step 62, paging software waits for a customer, employee, or service call to be received from alerting device 56 or from operator input. If the call contains a request for assistance, the method continues to step 64.

In step 64, paging software records location information from alerting device 56. Alternatively, paging software records operator input of customer, employee, or service location information.

In step 66, paging software 30 locates pagers 16. Paging software 30 causes control software 20 to transmit a query messages addressed to pagers 16. All operating pagers 16 send messages in response to the query messages. Paging software 30 uses relative received signal strength information and triangulation techniques to locate pagers 16.

In step 68, an employee is chosen to respond to the call. Paging software 30 may choose the employee automatically. Paging software 30 may determine and choose the closest employee to the customer. Paging software 30 may also determine the closest employee having the most skill to handle the call using product location file 31 and employee skill file 33. For example, if the call is a customer assistance call, paging software 30 may also determine the closest employee having the most skill in the products located in the vicinity of the customer.

Alternatively, an operator may choose an employee after viewing or printing employee location information.

In step 70, the chosen employee is alerted to respond to the call. Paging software 30 may automatically send a message to the chosen employee containing the customer, employee, or service location information. Alternatively, an operator may broadcast a message to the chosen employee over a loudspeaker in the store. The method then returns to step 62 to wait for another call.

Although the present invention has been described with particular reference to certain preferred embodiments thereof, variations and modifications of the present invention can be effected within the spirit and scope of the following claims.

I claim:

1. A method of dispatching an individual in a transaction establishment comprising the steps of:
   (a) receiving a message indicative of a problem in the transaction establishment;
   (b) recording a location of the problem from the message;
   (c) locating pagers carried by the individual and other individuals in the transaction establishment by an electronic price label system including the substeps of
       (c-1) transmitting a query message addressed to the pagers;
       (c-2) sending responses to the query message by the pagers;
       (c-3) receiving the responses by a plurality of receivers; and
       (c-4) determining locations of the pagers using signal strength information determined from the responses;
   (d) choosing the individual to respond to the problem based upon the locations of the pagers; and
   (e) sending a message containing the location of the problem to the pager carried by the individual to alert the individual to respond to the problem by the electronic price label system.

2. The method as recited in claim 1, wherein the message indicative of the problem is from a customer in the transaction establishment.

3. The method as recited in claim 1, wherein the message indicative of the problem is from an employee of the transaction establishment.

4. The method as recited in claim 1, wherein the message indicative of the problem is from a another system in the transaction establishment.

5. The method as recited in claim 1, wherein step (d) comprises the substep of:
   (d-1) choosing the individual because the individual is closest to the problem.

6. The method as recited in claim 1, wherein step (d) comprises the substep of:
   (d-1) choosing the individual because the individual is most skilled to handle the problem.

7. The method as recited in claim 1, wherein the individual is an employee.

8. A method of dispatching an individual in a transaction establishment comprising the steps of:
   (a) receiving a call for assistance from a caller in the transaction establishment;
   (b) recording a location of the caller;
   (c) locating pagers carried by the individual and other individuals in the transaction establishment by an electronic price label system including the substeps of
       (c-1) transmitting a query message addressed to the pagers;
       (c-2) sending responses to the query message by the pagers;
       (c-3) receiving the responses by a plurality of receivers; and
       (c-4) determining locations of the pagers using signal strength information determined from the responses;
   (d) choosing the individual to respond to the call; and
   (e) sending a message containing the location of the caller to the pager carried by the individual to alert the individual to respond to the call by the electronic price label system.

9. A system for dispatching an individual in a transaction establishment comprising:
   means for receiving a message indicative of a problem in the transaction establishment;
   means for recording a location of the problem from the message;
   an electronic price label system for locating pagers carried by the individual and other individuals in the transaction establishment including a number of transmitters in the transaction establishment for transmitting a query message addressed to the pagers, a number of receivers in the transaction establishment for receiving response messages from the pagers, and means for determining signal strength information from the response messages; and
   means for choosing the individual to respond to the problem based upon locations of the pagers;
   wherein the electronic price label system additionally sends a message containing the location of the problem to the pager carried by the individual to alert the individual to respond to the problem.

10. A system for dispatching an individual in a transaction establishment comprising:
    means for receiving a first message indicative of a problem in the transaction establishment;
    means for recording a location of the problem from the first message;
    an electronic price label system including
        a number of transmitters in the transaction establishment for transmitting a second message addressed to a pager carried by the individual;
        a number of receivers in the transaction establishment for receiving a third message from the pager, and
        a computer which determines a location of the pager from signal strength information from the third message, and which sends a fourth message containing the location of the problem to the pager carried by the individual to alert the individual to respond to the problem.

11. The system as recited in claim 10, wherein the first message is from a customer in the transaction establishment.

12. The system as recited in claim 10, wherein the first message is from an employee of the transaction establishment.

13. The system as recited in claim 10, wherein the first message is from a system in the transaction establishment.

14. The method as recited in claim 10, wherein the individual is an employee.

15. A method of dispatching an individual in a transaction establishment comprising the steps of:
    (a) receiving a call for assistance from a caller in the transaction establishment;
    (b) recording a location of the caller;
    (c) locating a pager carried by the individual in the transaction establishment by an electronic price label system including the substeps of
        (c-1) transmitting a query message addressed to the pager;
        (c-2) sending a response to the query message by the pager;
        (c-3) receiving the response by a plurality of receivers; and
        (c-4) determining a location of the pager using signal strength information determined from the response; and
    (d) sending a message containing the location of the caller to the pager to alert the individual to respond to the call by the electronic price label system.

* * * * *

UNITED STATES PATENT AND TRADEMARK OFFICE
CERTIFICATE OF CORRECTION

PATENT NO. : 6,774,765 B1
DATED : August 10, 2004
INVENTOR(S) : Goodwin, J. C., III It is certified that error appears in the above-identified patent and that said Letters Patent is hereby corrected as shown below:

<u>Column 5,</u>
Line 31, after "from" delete "a".

Signed and Sealed this

Third Day of May, 2005

JON W. DUDAS
*Director of the United States Patent and Trademark Office*